United States Patent
Brzozowski et al.

(10) Patent No.: US 11,700,172 B2
(45) Date of Patent: Jul. 11, 2023

(54) DYNAMIC NETWORK AWARENESS

(71) Applicant: TIVO CORPORATION, San Jose, CA (US)

(72) Inventors: John Jason Brzozowski, Schwenksville, PA (US); John Leddy, Bryn Mawr, PA (US)

(73) Assignee: TIVO CORPORATION, San Jose, CA (US)

( * ) Notice: Subject to any disclaimer, the term of this patent is extended or adjusted under 35 U.S.C. 154(b) by 0 days.

(21) Appl. No.: 17/490,191

(22) Filed: Sep. 30, 2021

(65) Prior Publication Data

US 2022/0021577 A1 Jan. 20, 2022

Related U.S. Application Data

(63) Continuation of application No. 16/430,229, filed on Jun. 3, 2019, now Pat. No. 11,165,637, which is a continuation of application No. 15/832,413, filed on Dec. 5, 2017, now abandoned, which is a continuation (Continued)

(51) Int. Cl.
*H04L 12/24* (2006.01)
*H04L 41/0806* (2022.01)
*H04L 41/0873* (2022.01)
*H04L 12/28* (2006.01)

(52) U.S. Cl.
CPC ...... *H04L 41/0806* (2013.01); *H04L 12/2821* (2013.01); *H04L 41/0873* (2013.01)

(58) Field of Classification Search
CPC ............ H04L 12/2821; H04L 41/0806; H04L 41/0873; H04L 12/705; H04L 12/761; H04L 45/18; H04L 45/16; H04L 45/02; H04L 45/22; H04L 45/28; H04L 45/58; H04L 69/40; H04L 12/24; H04L 12/28;

(Continued)

(56) References Cited

U.S. PATENT DOCUMENTS

| 6,654,387 B1 | 11/2003 | Beser et al. |
| 6,917,626 B1 * | 7/2005 | Duvvury ............. H04L 61/5069 370/466 |
| 7,353,021 B2 | 4/2008 | Ejzak et al. |

(Continued)

FOREIGN PATENT DOCUMENTS

WO 2001075626 10/2001

OTHER PUBLICATIONS

"D-Link DAP-1522 User Manual," Jun. 18, 2009 (Jun. 18, 2009), pp. 1-100, XP055145647, Retrieved from the Internet: URL: http://www.dlink.com/-/media/Consumer_Products/DAP/DAP%201522/Manual/DAP%201522_manual_v1_EN_UK.pdf [retrieved on Oct. 10, 2014].

(Continued)

*Primary Examiner* — Man U Phan
(74) *Attorney, Agent, or Firm* — Haley Guiliano LLP

(57) ABSTRACT

Systems and methods for managing a network are disclosed. One method can comprise determining presence of a first network device associated with a network. If the first network device is not present, a second network device can be configured to assume authority of the network. If the first network device is present, the second network device can be configured to join the network. Other aspects relate to providing services in an environment having multiple service providers.

20 Claims, 8 Drawing Sheets

Related U.S. Application Data of application No. 13/891,496, filed on May 10, 2013, now Pat. No. 9,866,432.

(58) Field of Classification Search
CPC ....... H04L 61/10; H04L 29/12; H04L 12/185; H04L 61/2092; H04L 12/741
USPC ........................................................ 370/254
See application file for complete search history.

(56) References Cited

U.S. PATENT DOCUMENTS

| | | | |
|---|---|---|---|
| 7,385,981 B2 | 6/2008 | Choi et al. | |
| 7,502,841 B2 | 3/2009 | Small et al. | |
| 7,539,193 B2 | 5/2009 | Pfeffer et al. | |
| 7,545,820 B2* | 6/2009 | Duvvury | H04L 61/5069 370/392 |
| 7,565,418 B2* | 7/2009 | Ferrari | H04L 41/046 709/224 |
| 7,886,033 B2* | 2/2011 | Hopmann | H04L 43/0811 709/224 |
| 7,925,729 B2* | 4/2011 | Bush | H04L 41/046 709/224 |
| 7,941,512 B2 | 5/2011 | Droms et al. | |
| 8,149,847 B2 | 4/2012 | Siripunkaw et al. | |
| 8,250,184 B2 | 8/2012 | Poeyhoenen et al. | |
| 8,463,890 B2* | 6/2013 | Bush | H04L 43/0811 709/224 |
| 8,484,332 B2* | 7/2013 | Bush | H04L 41/0233 709/224 |
| 8,582,572 B2* | 11/2013 | Fernandez Gutierrez | H04L 45/02 370/390 |
| 8,631,100 B2 | 1/2014 | Gandhewar et al. | |
| 8,671,184 B2* | 3/2014 | Bush | H04L 41/0893 709/224 |
| 8,949,385 B2* | 2/2015 | Keesara | H04L 45/66 370/254 |
| 9,161,326 B2 | 10/2015 | Popa et al. | |
| 9,219,996 B2* | 12/2015 | Guttman | H04W 4/08 |
| 9,300,627 B2 | 3/2016 | Danforth | |
| 9,628,435 B2* | 4/2017 | Thubert | H04L 45/745 |
| 9,756,010 B2* | 9/2017 | Antony | H04L 61/5046 |
| 9,787,572 B2 | 10/2017 | Voit et al. | |
| 9,867,116 B2* | 1/2018 | Sanderson | H04W 40/36 |
| 10,003,565 B2* | 6/2018 | George, IV | H04L 61/4511 |
| 10,277,501 B2* | 4/2019 | Mentze | H04L 45/18 |
| 10,448,312 B2* | 10/2019 | Sanderson | H04W 8/06 |
| 10,652,137 B2 | 5/2020 | Voit et al. | |
| 10,827,415 B2* | 11/2020 | Sanderson | H04W 8/06 |
| 10,893,017 B2* | 1/2021 | George, IV | H04L 61/4511 |
| 11,044,241 B2* | 6/2021 | Lee | H04L 63/0853 |
| 11,165,637 B2* | 11/2021 | Brzozowski | H04L 41/0806 |
| 11,438,303 B2* | 9/2022 | Yadav | H04L 41/0806 |
| 2002/0147819 A1 | 10/2002 | Miyakoshi et al. | |
| 2003/0106067 A1 | 6/2003 | Hoskins et al. | |
| 2005/0005154 A1 | 1/2005 | Danforth et al. | |
| 2007/0111568 A1 | 5/2007 | Ferrari et al. | |
| 2010/0131663 A1 | 5/2010 | Lee et al. | |
| 2012/0131197 A1* | 5/2012 | Prentice | H04L 61/5046 709/226 |
| 2012/0224536 A1 | 9/2012 | Hahn et al. | |
| 2012/0233352 A1 | 9/2012 | Li | |
| 2012/0269059 A1 | 10/2012 | Gupta et al. | |
| 2014/0032782 A1 | 1/2014 | Jiang et al. | |
| 2014/0337530 A1 | 11/2014 | Amishav et al. | |
| 2018/0316576 A1* | 11/2018 | Kang | H04L 41/08 |
| 2020/0128404 A1* | 4/2020 | Lee | H04L 63/10 |

OTHER PUBLICATIONS

European Search Report dated Feb. 13, 2015 for European Patent Application No. 14167717.9, which was filed on May 9, 2014 and published as EP 2802102 on Nov. 12, 14 (Inventor—Brzozowski // Applicant—Comcast Cable Communications, LLC.

* cited by examiner

DYNAMIC NETWORK AWARENESS

CROSS-REFERENCE TO RELATED APPLICATIONS

This application is a continuation of U.S. patent application Ser. No. 16/430,229 (now U.S. Pat. No. 11,165,637), filed Jun. 3, 2019, which is a continuation of U.S. patent application Ser. No. 15/832,413 (now abandoned), filed Dec. 5, 2017, which is a continuation of U.S. patent application Ser. No. 13/891,496 (now U.S. Pat. No. 9,866,432), filed May 10, 2013. The disclosures of each are hereby incorporated herein in their entireties.

BACKGROUND

Networks, such as a customer premises networking environment, can include one or more networking devices. In certain situations, one or more networking devices can each assume they are authoritative for the entire network or premise. This assumption often leads to conflicts and does not allow multiple networking devices to service the needs of end-users independently.

Known solutions often assume that customers or end users have a specific degree of know how or knowledge to manually configure networking devices to operate in the desired manner. There are cases where even manual configuration is not viable, leaving providers and consumers without the means to configure premises networks to meet the growing requirements for advanced services throughout the premise. These and other shortcomings are addressed by the present disclosure.

SUMMARY

It is to be understood that both the following general description and the following detailed description are exemplary and explanatory only and are not restrictive, as claimed. Disclosed are methods and systems for providing network services to one or more user devices, clients, or sub-networks. The methods and systems described herein, in one aspect, can comprise automatically and dynamically configuring one or more networking devices to adapt to network conditions and authoritative conflicts. Also described are techniques to avoid and prevent coverage and/or provisioning overlap by networking devices.

In another aspect, methods can comprise providing a first service via a first network device and providing a second service via a second network device. The first service can be different from the second service, or the first service can be the same/similar to the second service. Conflicts between the first network device and the second network device can be detected and one or more of the first network device and the second network device can be automatically configured to resolve the detected conflict.

In another aspect, methods can comprise receiving first information via a first network device, the first information relating to a service, wherein the first network device is associated with a first service provider. Second information can be provided via a second network device based on the first information received via the first network device, wherein the second information facilitates provision of a service.

In a further aspect, a method can comprise detecting a network having a first network device associated therewith. The method can further comprise configuring a second network device to join the network. First availability information relating to one or more first services available via the network can be provided by the first network device, wherein the first network device is configured to provide the one or more first services. Second availability information relating to one or more second services available via the network can be provided by the second network device, wherein the second network device is configured to provide the one or more second services.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
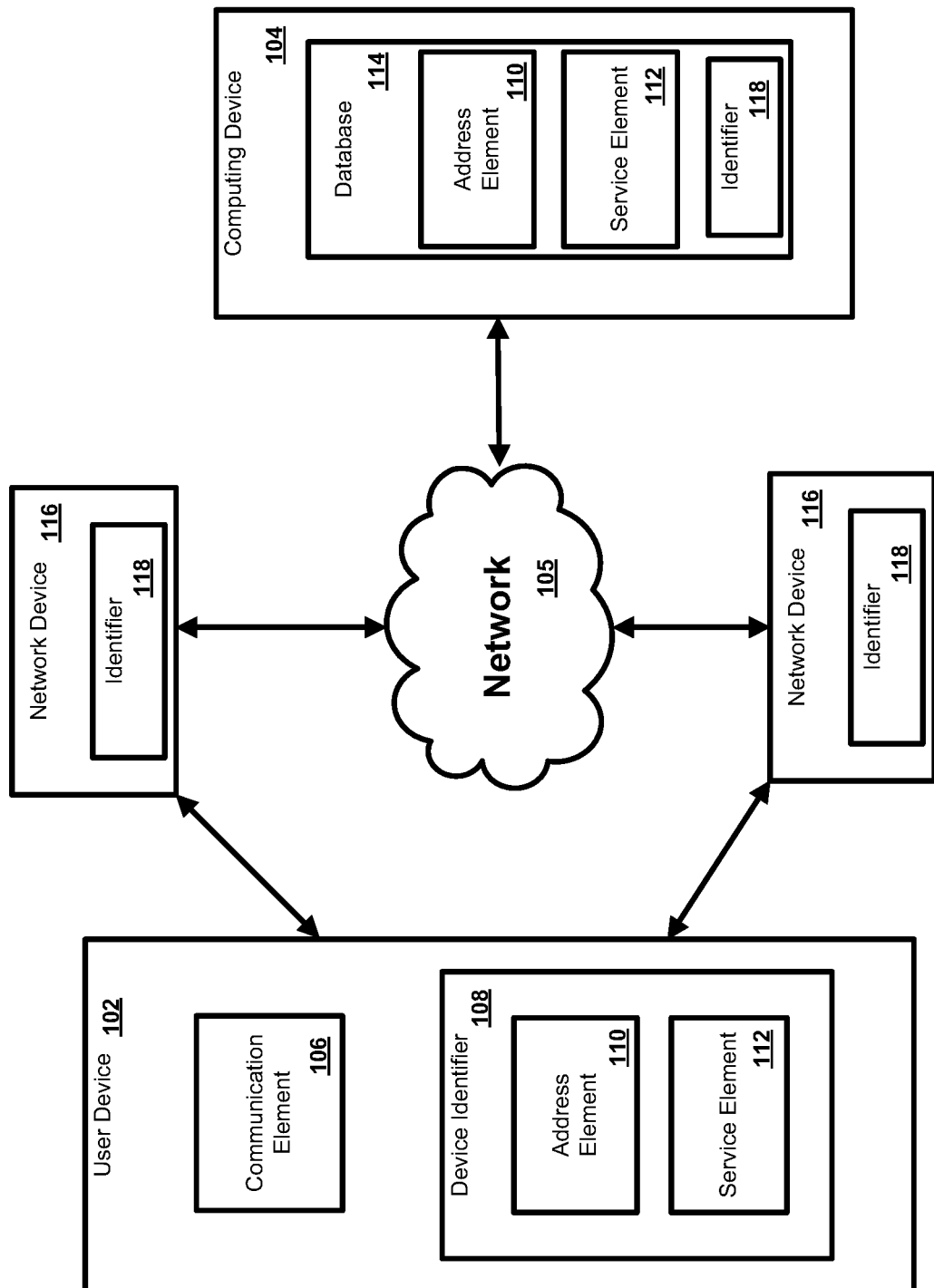
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, in one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, one or more network devices 116 can be configured to dynamically detect its role (e.g., authoritative device, client, etc.) and to identify and apply the required configuration to either provide services, including broadband, video, and the like, to an entire premises or to join an existing premises network to provide a subset of services that leverage an existing premises network infrastructure. An existing premises network could be provided by an operator, for example, an operator that uses a similar technology and protocols for providing access to services such as IP services, or an operator that leverages a completely different type of access technology or protocols. As an example one or more network devices 116 can be coupled to an existing premises network. As a further example, a particular one of the network devices 116 can be configured to be an authoritative device for a network such as a local network (e.g., premises network). In an aspect, an authoritative device can be configured to govern or enable connectivity to the Internet or other remote resources, provide address and/or configuration services like DHCP, and/or provide naming or service discovery services for a premises, or a combination thereof.

Figure 2:
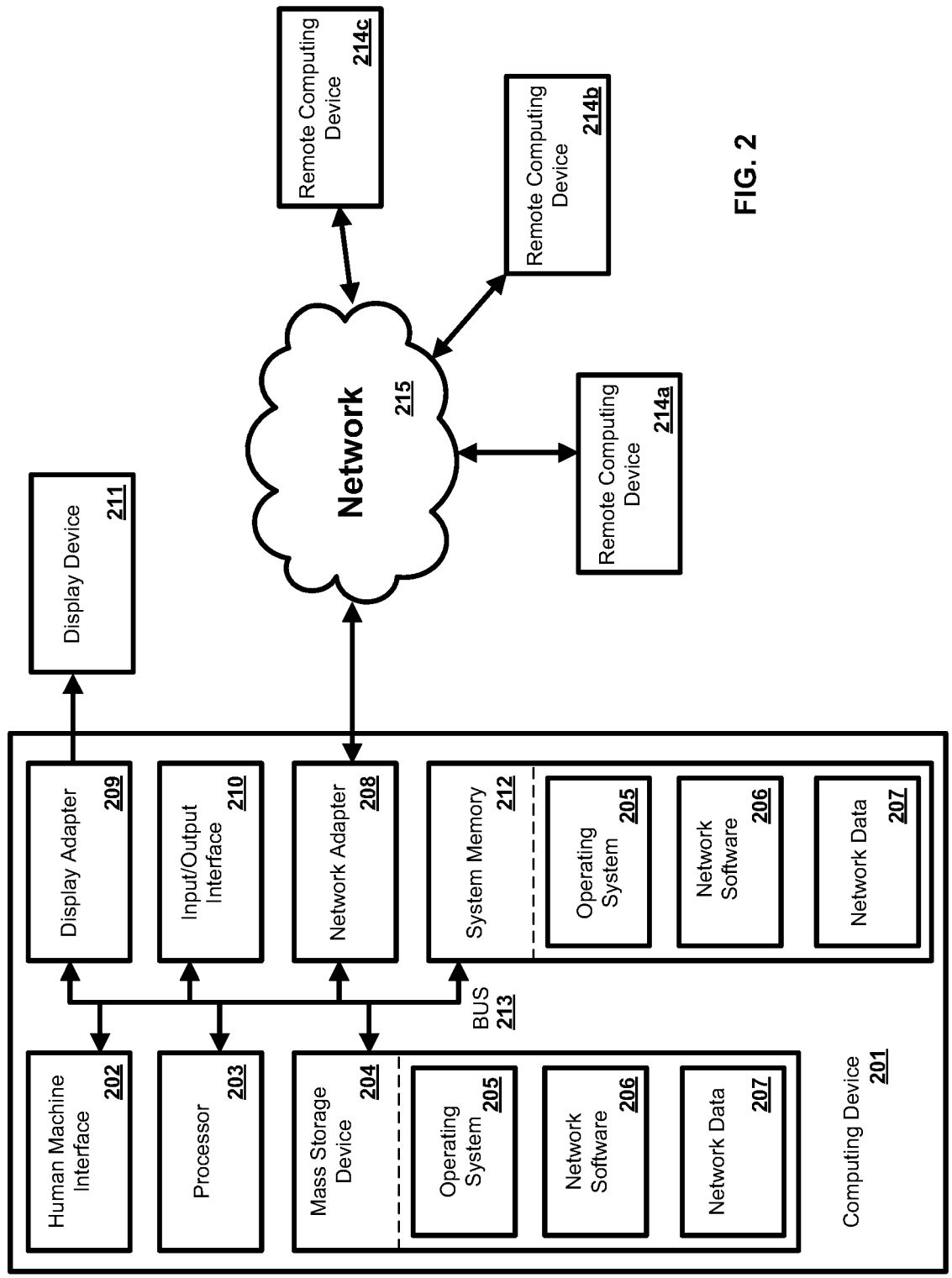
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102, the computing device 104, and/or the network device 116 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media, including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
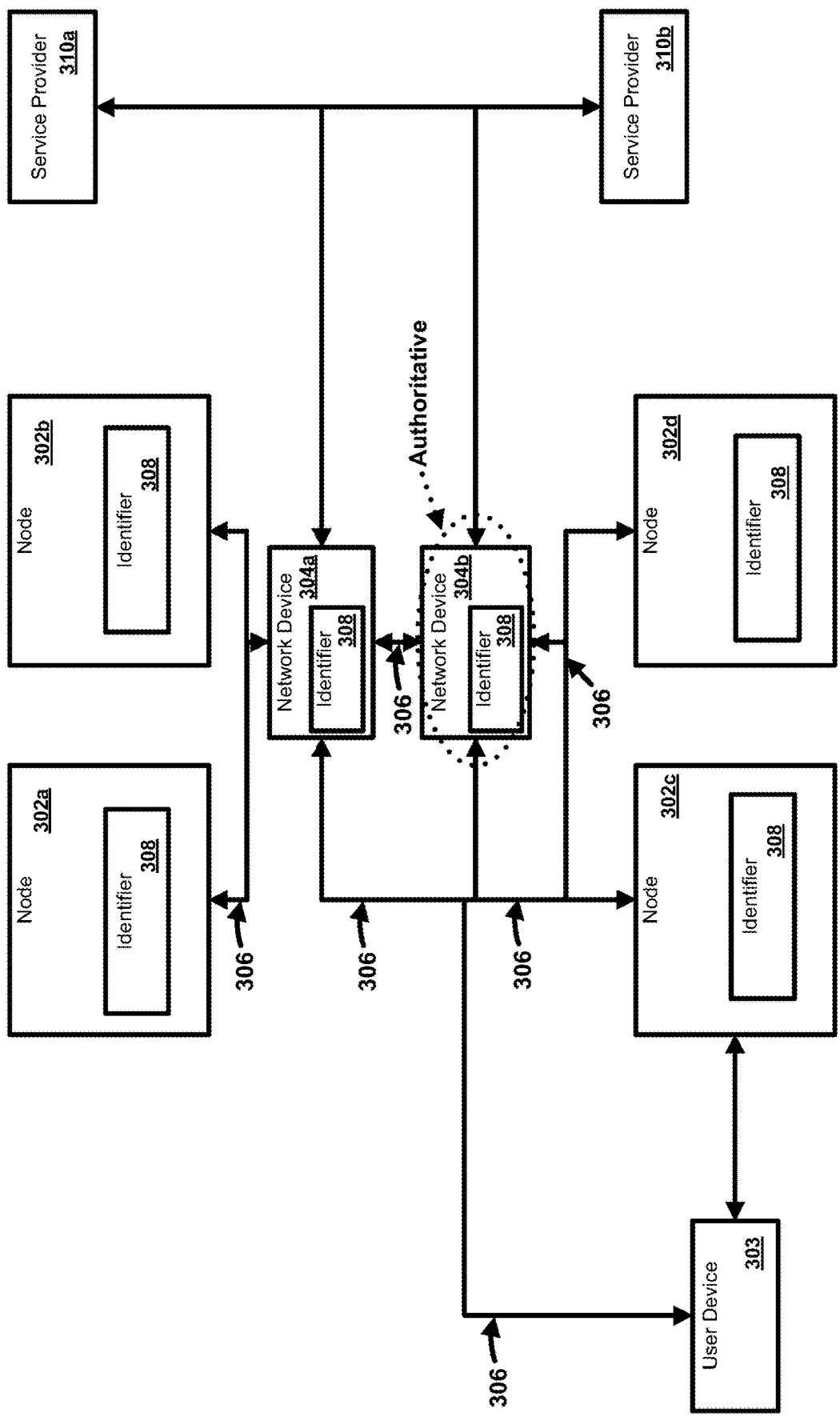
FIG. 3 is a diagram of an exemplary system and network.
Figure 4:
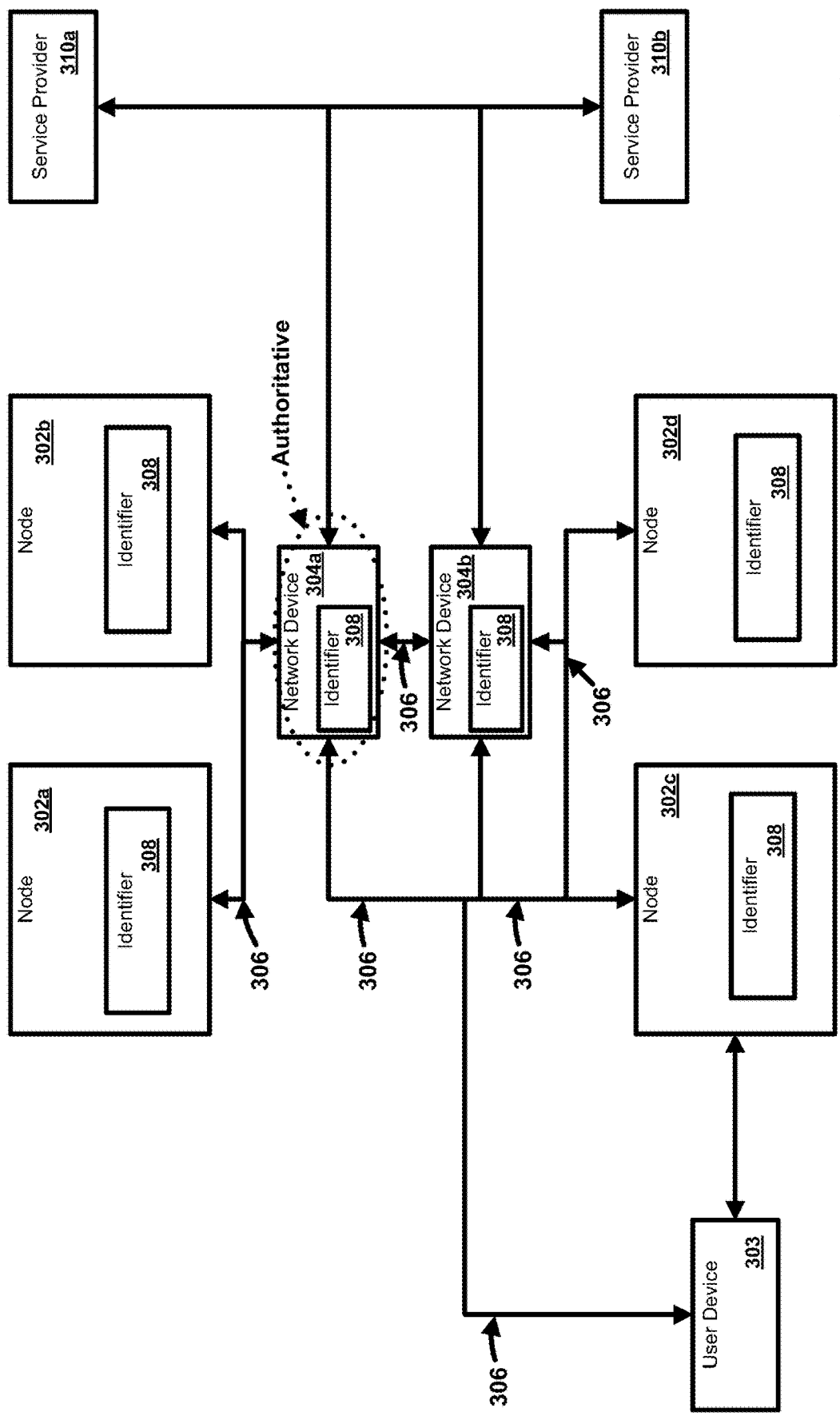
FIG. 4 is a diagram of an exemplary system and network.

FIGS. 3-4 illustrate an exemplary system and network. In an aspect, a plurality of nodes 302a, 302b, 302c, 302d can be in communication with one or more user devices 303 and one or more network devices 304a, 304b. As an example, one or more nodes can be a network access point, router, switch, communication device, or the like. As another example, one or more user devices 303 can be an electronic device such as a computer, a smartphone, a laptop, a tablet, a set top box, a display device (e.g., television), or other device capable of communicating with one or more of the nodes 302a, 302b, 302c, 302d of the network. As a further example, one or more of the network devices 304a, 304b can be a gateway, router, switch, communication device terminal server, cable modem termination system, and the like.

In an aspect, one or more of the nodes 302a, 302b, 302c, 302d can be configured to communicate with another of the nodes 302a, 302b, 302c, 302d and/or one or more of the network devices 304a, 304b via one or more communication paths 306, which can be wired, wireless, or combination thereof. In an aspect, the one or more communication paths 306 can comprise one or more uninterrupted communication links, sequential links, pre-defined paths or links, and/or intervening nodes. Links can comprise a single point to point connection between two devices or access points. Paths can comprise one or more links. As an example, one or more of the communication paths can comprise one or more of the nodes 302a, 302b, 302c, 302d. As a further example, one or more of the nodes 302a, 302b, 302c, 302d can be configured as a wireless network. In an aspect, one or more of the communication paths 306 can be configured to transmit (e.g., wired or wireless) one or more services.

In an aspect, one or more of the nodes 302a, 302b, 302c, 302d and/or the networking devices 304a, 304b can comprise an identifier 308. As an example, one or more identifiers 308 can be an Internet Protocol (IP) Address IPV4/IPV6 or a media access control address (MAC address), or the like. Any uniquely identifiable attribute can be used as the identifier 308. Such attributes can comprise one or more of an IP Address, serial number, latitude/longitude, geo-encoding, custom assigned unique identifier, global unique identifier (GUID), and the like. As a further example, one or more identifiers 308 can be a unique identifier for facilitating communications on the physical network segment. In an aspect, each of the nodes 302a, 302b, 302c, 302d can comprise a distinct identifier 308. As an example, the identifiers 308 can be associated with a physical location of the nodes 302a, 302b, 302c, 302d.

In an aspect, one or more service providers 310a, 310b can be in communication with one or more network devices 304a, 304b. The service providers 310a, 310b can comprise security architecture for the network of nodes 302a, 302b, 302c, 302d or other distributed systems. As an example, the service providers 310a, 310b can control which user devices (e.g., user device 303) are allowed access to which services. As a further example, the service providers 310a, 310b can control the resources available to the network of nodes 302a, 302b, 302c, 302d and/or network devices 304a, 304b.

As shown in FIG. 3, one or more of the network devices 304a, 304b can detect an existing network such as a premises network or local area network, for example. Various techniques can be used for detecting an existing network. As an example, detection of an existing DHCPv4 and/or DHCPv6 server is one technique. As a further example, IPv6 router detection can be implemented as a specific technique for IPv6 networks. In the case where DHCP is being detected, the joining node that is compliant with this approach can initiate a DHCPv6 client to attempt active DHCP servers. Joining nodes can also passively detect the presence of one or more IPv6 routers by interrogating specific types of network communications. Joining nodes can also communicate with known IP addresses to detect the presence of other devices which may include routers.

In an aspect, the network device 304a can detect network device 304b as the authoritative device of a network, such as a premises network (e.g., LAN). In another aspect, the network device 304a can dynamically configure itself or can be configured to join the existing network, such as the detected premises network. As an example, such a mode of operation can facilitate the delivery of services within a premises that may not be offered by a primary premises network operator (e.g., service provider) servicing the existing network. As another example, the network device 304b can provide certain services (e.g., broadband) to the premises, while the network device 304a can provide other services (e.g., video services, content services, etc.) to the premises.

In an aspect, one or more network devices 304a, 304b can initialize a DHCPv4 client and send a request for a dynamically assigned IPv4 address. As an example, if assigned an IPv4 address via DHCPv4, the DHCPv4 server is another device on the network, and the assigned IPv4 address facilitates network connectivity. As such, the premises networking devices (e.g., networking device 304a) may not attempt to be authoritative for the premises for IPv4. In turn the premise-networking device (e.g., networking device 304a) can join the existing network as a client. As a further example, if IPv4 provisioning or configuration fails the premise-networking device (e.g., networking device 304a) can assume authority for IPv4 services in the premises and can configure itself accordingly.

In an aspect, one or more network devices 304a, 304b can initialize an IPv6 router and neighbor discovery and/or DHCPv6 to implement dynamic IPv6 configuration. As an example, if the premise-networking device (e.g., networking device 304a) detects a default router for IPv6 and the default router is another device on the premises network, the premises-networking device can attempt both IPv6 auto-configuration and/or DHCPv6 to acquire IPv6 addressing as governed by parameters transmitted as part of IPv6 router discovery and neighbor discovery. If the premise-networking device (e.g., networking device 304a) is provisioned with an IPv6 address from or as a result of another device on the premises network, the premises networking devices (e.g., networking device 304a) may not attempt to be authoritative for the premises for IPv6. In turn, the premise-networking device (e.g., networking device 304a) can join the existing network as a client. As a further example, if IPv6 provisioning or configuration fails, the premise-networking device (e.g., networking device 304a) can assume authority for IPv6 services in the premises and can configure itself accordingly. In another aspect, one device can assume authority for IPv6, while another device can assume authority for IPv4. Other authority configurations can be implemented.

In an aspect, one of a first network device (e.g., networking device 304a) and a second network device (e.g., networking device 304b) can request a service be provided. In another aspect, the service can be provided via the non-requesting network device. As an example, the second network device can request the delivery of data (e.g., content), but the delivery of the requested data is provided via the first network device. As another example, the first network device can provide command and control information to a first service provider (e.g., service provider 310a), but the actual command and control can be implemented via a service provided via the second network device associated with the second service provider (e.g., service provider 310b). As a further example, the first network device can authenticate a request for service with a first service provider. Once authenticated, the requested service can be provided via the second network device, which may not be associated with the first service provider.

As shown in FIG. 4, a network device 304a can be configured to be authoritative for a network such as a premises network. In an aspect, for IPv4, the network device 304a can be configured to minimally initialize and enable services, such as IPv4 NAT, DHCPv4 server and client or the like. As an example, IPv4 NAT can facilitate sharing of a single IPv4 address across multiple networked devices. As a further example, a DHCPv4 server and client can allow hosts in the premises to dynamically request and be assigned IPv4 addresses [IETF RFC2131]. The allocation of RFC1918 private IPv4 addresses can be configured minimally. Similar techniques can be implemented in IPv6 and DHCPv6.

In an aspect, for IPv6, the network device 304a can be configured to minimally initialize and enable services, such as IPv6 routing and security services, IPv6 router and neighbor discovery, DHCPv6 server and client, or the like. As another example, IPv6 router and neighbor discovery—as specified by IETF RFC4861 and RFC4862. This should also include enabling support for IPv6 auto-configuration within the premise.

As a further example, DHCPv6 server and client—this allows for hosts in the premises to dynamically request and be assigned IPv6 addresses and prefixes [IETF RFC3315, RFC3633]. It is assumed that globally routable IPv6 address space will minimally be allocated to the premise. As such it is assumed that no IPv6 address sharing will be used in the premise. Other types of IPv6 address space can be used.

In another aspect, an authoritative networking device 304a can dynamically detect and prevent other premises networking devices from gaining authoritative control over the premise. As an example, the authoritative premises networking device can perform at least one or more of the following:

1. Continually monitor and detect the existence of other devices that are attempting to provide services; and/or 2. Continually monitor and detect the existence of other devices that are attempting to use the same IP configuration of the intended authoritative device.

Upon detection of one or more devices attempting to provide services (e.g., IP-related services) for the premises or a conflict, or attempted use, of the authoritative premises network device's IP configuration, the intended authoritative device can disable the alternate devices. The authoritative device can initialize an IP interface that intentionally creates an IP conflict that can prevent the other devices from initializing. Further, the authoritative device can, in turn, reconfigure its IP interface with settings that are unique and non-conflicting, while maintaining the conflicting configurations. Such operation can prevent or disable the delivery of unauthorized IP services in the premise, as well as address attempts to leverage overlapping IP configurations in the premise.

Figure 5:
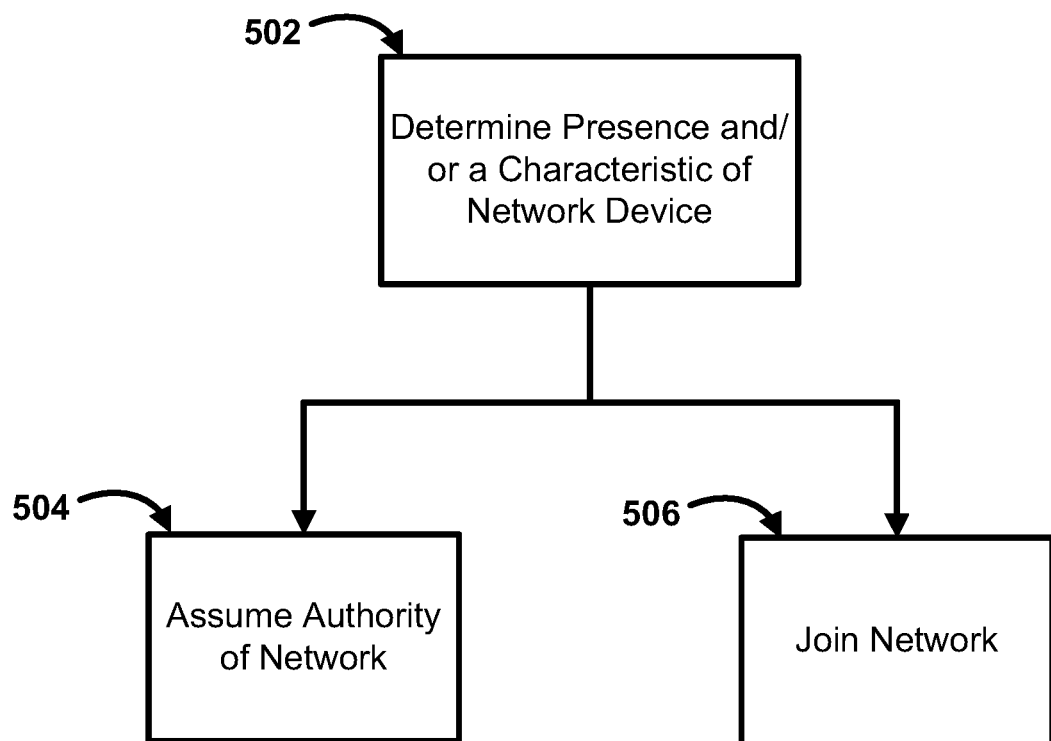
FIG. 5 is a flow chart of an exemplary method.

In an aspect, provided are methods for managing a network. An exemplary method is shown in FIG. 5. In step 502, one or more of a presence or characteristic of a device can be determined. In an aspect, the device can be a first network device associated with a network such as a local area network. In another aspect, the device can be a network device supporting IPv4 or IPv6 or both. As an example, the local area network can be associated with a particular premise, such as a user's home or office, or the like. As another example, determining the presence of a first network device can comprise requesting an IPv4 address. In an aspect, a DHCPv4 client can be initialized and a request can be transmitted for a dynamically assigned IPv4 address. If an IPv4 address is assigned via DHCPv4, it can be assumed that the DHCPv4 server is another device on the network. As a further example, determining the presence of a first network device can comprise neighbor discovery (e.g., IPv6 functionality). If alignment is required with IPv4, address resolution protocol (ARP) can be used.

In step 504, a device can be configured to assume authority of a network. In an aspect, an authoritative device can be configured to govern or enable connectivity to the Internet (or other network) or other remote resources, provide address and/or configuration services like DHCP, and/or provide naming or service discovery services for a premises, or a combination thereof. In another aspect, if the presence of the first network device is not detected, a second network device can be configured to assume authority of the network. In another aspect, if an authoritative device is not detected on a network, a device can be configured to assume authority of the network. As an example, the device can be a second networking device configured to support IPv4 or IPv6 or both. An authoritative networking device can dynamically detect and prevent other premises networking devices from gaining authoritative control over the premise. As an example, the authoritative premises networking device can perform at least one or more of the following:

1. Continually monitor and detect the existence of other devices that are attempting to provide services; and/or
2. Continually monitor and detect the existence of other devices that are attempting to use the same IP configuration of the intended authoritative device.

In step 506, a device can be configured to join an existing network. In an aspect, if the first network device is present, a second network device can be configured to join a network associated with the first network device. As an example, the device can be a second networking device configured to support IPv4 or IPv6 or both. As a further example, a joining device or node can access resources and communicate with other types of devices in the same premises or the Internet, while not directly providing authoritative services to other adjacent nodes or devices. In such a case, it is possible that the joining node can join a network and communicate or interact with other devices to enable non-authoritative services like those related to voice, video, or content.

Figure 6:
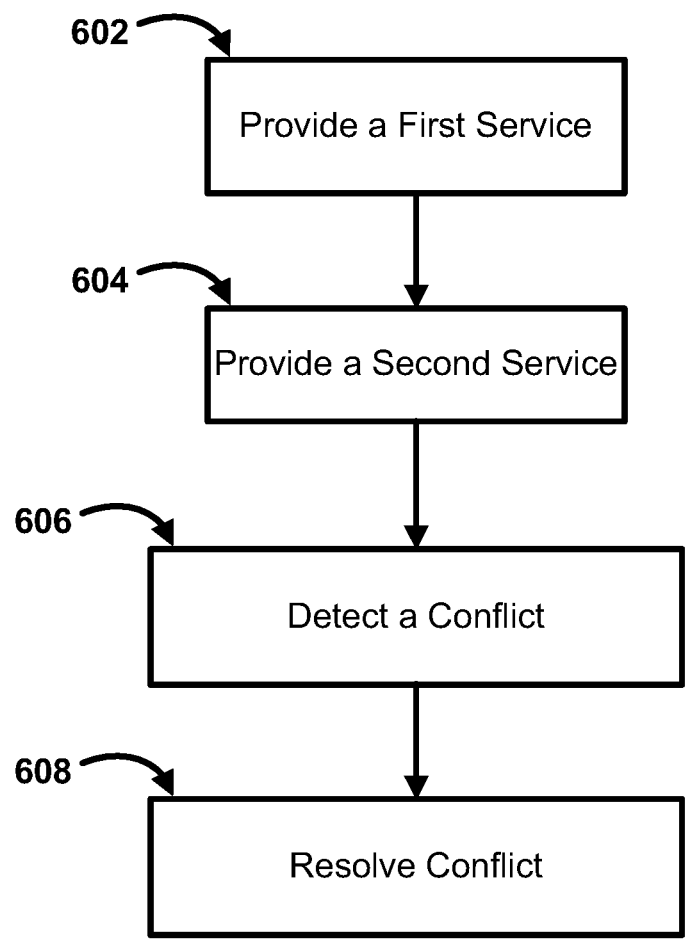
FIG. 6 is a flow chart of an exemplary method.

In an aspect, provided are methods for managing a network. An exemplary method is shown in FIG. 6. In step 602, a first service can be provided. As an example, the first service can comprise IPv4 NAT service, DHCPv4 server and client service, IPv6 routing and security service, IPv6 router discovery, IPv6 neighbor discovery, or IPv6 server and client service, or a combination thereof. As a further example, the first service can comprise broadband Internet service, premises security service, video service, telephony service, e.g., VoIP service, or a combination thereof. In an aspect, the first service can be provided via a first network device such as a premises network device.

In step 604, a second service can be provided. As an example, the second service can comprise IPv4 NAT service, DHCPv4 server and client service, IPv6 routing and security service, IPv6 neighbor discovery, IPv6 router discovery, or IPv6 server and client service, or a combination thereof. As a further example, the second service can comprise broadband Internet service, premises security service, video service, telephony service, e.g., VoIP service, or a combination thereof. In an aspect, the second service can be provided via a second network device, such as a premises network device. As a further example, the first service is different from the second service. As such, one or more devices can provide the first service, while one or more other devices can provide the second service. In another aspect, one or more of the first network device and the second network device can support IPv4 or IPv6 or both.

In step 606, a conflict can be detected. In an aspect, the conflict can be detected between the first network device and the second network device (or other devices). As an example, the conflict can relate to providing one or more of the first service and the second service. Example conflicts include the presence of two or more DHCP servers for IPv4 or IPv6 or two or more IPv6 routers advertising themselves as the default route to the Internet or other remote resources. As another example, the conflict can comprise an authoritative conflict or overlapping IP configuration on the network, or a combination thereof. As a further example, the conflict can be an intentional conflict implemented between devices and/or services.

In step 608, the conflict can be resolved. In an aspect, one or more of the first network device and the second network device can be automatically configured to resolve the detected conflict. As an example, one or more of the first network device and the second network device can be configured as an authoritative device of the network in order to resolve the conflict. As another example, one or more devices such as the authoritative device can monitor and detect the existence of other devices that are attempting to provide services and/or monitor and detect the existence of other devices that are attempting to use the same IP configuration of the intended authoritative device. As a further example, the one or more devices such as the authoritative device can impede or prohibit authoritative challenges or takeover by another device.

Figure 7:
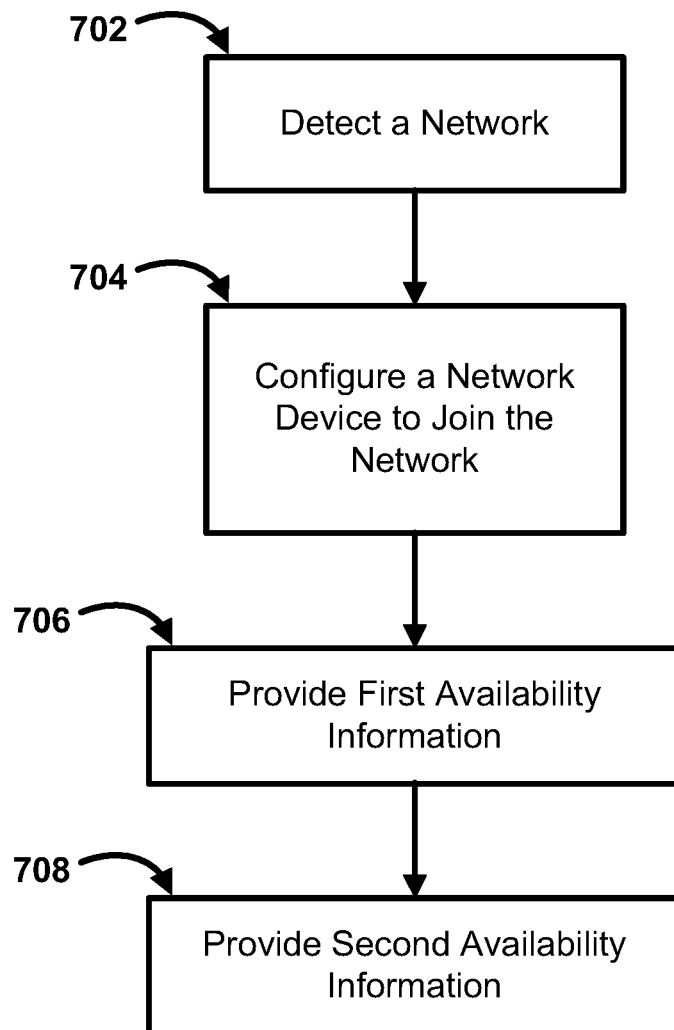
FIG. 7 is a flow chart of an exemplary method.

In an aspect, FIG. 7 illustrates an exemplary method for managing a network. In step 702, a network can be detected (e.g., discovered). In an aspect, the network can have a first network device associated therewith. In another aspect, the first network device can be a network device supporting IPv4 or IPv6 or both. As an example, the network can be a LAN associated with a particular premise, such as a user's home or office, or the like. As an example, detecting a network can comprise requesting an IPv4 address. As a further example, detecting a network can comprise neighbor discovery (e.g., IPv6 functionality). If alignment is required with IPv4, address resolution protocol may be used.

In step 704, a network device can be configured to join the network. In an aspect, the joining device can join the network by automatically configuring itself with IP parameters for IPv4 and/or IPv6 and/or activating a DHCP server for IPv4 and/or IPv6 and/or activating itself an IP router for IPv4 and/or IPv6. In another aspect, the network device can be a second network device joining a network shared by a first network device. Other techniques can be implemented.

In step 706, first availability information can be provided (e.g., accessed, received, broadcast, discovered, etc.). In an aspect, the first availability information can relate to one or more first services available via the network. The first network device can be configured to provide the one or more first services. As an example, the first service can comprise IPv4 NAT service, DHCPv4 server and client service, IPv6 routing and security service, IPv6 neighbor discovery, IPv6 router discovery, or IPv6 server and client service, or a combination thereof. As a further example, the first service can comprise broadband Internet service, premises security service, video service, VoIP service, or a combination thereof. In an aspect, the first service can be provided via a first network device such as a premises network device.

In step 708, second availability information can be provided (e.g., accessed, received, broadcast, discovered, etc.). In an aspect, the second availability information can relate to one or more second services available via the network. The second network device can be configured to provide the one or more second services. As an example, the second service can comprise IPv4 NAT service, DHCPv4 server and client service, IPv6 routing and security service, IPv6 neighbor discovery, IPv6 router discovery, or IPv6 server and client service, or a combination thereof. As a further example, the second service can comprise broadband Internet service, premises security service, video service, VoIP service, or a combination thereof.

In an aspect, a user device can request or access one or more of the first availability information and the second availability information. The one or more of the first availability information and the second availability information can facilitate the delivery of related services to the user device. As an example, the user device can use the first availability information to access services provided by the first network device, while using the second availability information to access services provided by the second network device. Availability information can comprise service discovery communications within the premises that allow end points to locate the desired resources on the local or remote network including node name to IP address mapping, network routing information, or application layer controls that enable content and services using Internet protocols.

Figure 8:
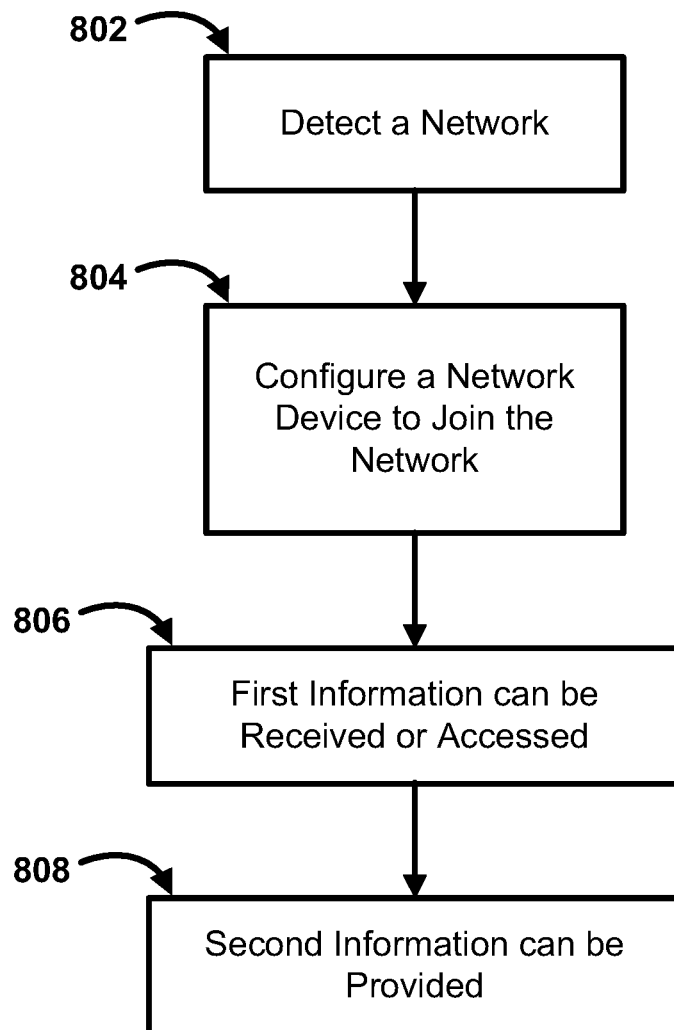
FIG. 8 is a flow chart of an exemplary method.

In an aspect, provided are methods for managing a network. An exemplary method is shown in FIG. 8. In step 802, a network can be provided (e.g., detected, discovered, provisioned, generated, etc.). In an aspect, the network can have a first network device associated therewith. In another aspect, the first network device can be a network device supporting IPv4 or IPv6 or both. As an example, the network can be a LAN associated with a particular premise, such as a user's home or office, or the like. As an example, detecting a network can comprise requesting an IPv4 address. As a further example, detecting a network can comprise neighbor discovery (e.g., IPv6 functionality). If alignment is required with IPv4, address resolution protocol may be used.

In step 804, a network device can be configured to join the network. In an aspect, the joining device can join the network by automatically configuring itself with IP parameters for IPv4 and/or IPv6 and/or activating a DHCP server for IPv4 and/or IPv6 and/or activating itself an IP router for IPv4 and/or IPv6. In another aspect, the network device can be a second network device joining a network shared by a first network device. In another aspect, the first network device can be associated with a first service provider and the second network device can be associated with a second service provider. The first service provider can be the same or different from the second network provider.

In step 806, first information can be received or accessed via one or more of the first network device and the second network device. In an aspect, the first information can relate to a service such as broadband Internet service, premises security service, video service, telephony service, VoIP service, or a combination thereof. The first information can comprise a request for service, command information, control information, or a combination thereof. As an example, the first information can comprise an authenticatable request to provide service. As a further example, the first information can comprise command and control information relating to a service.

In step 808, second information can be provided (e.g., transmitted, presented) via one or more of the first network device and the second network. In an aspect, the second information can be provided based on the first information received. The second information can relate to a service such as broadband Internet service, premises security service, video service, telephony service, VoIP service, or a combination thereof. As an example, the service can relates to providing content and the second information can comprise the content provided.

In an aspect, one of the first network device and the second network device can request a service be provided. In another aspect, the service can be provided via the non-requesting network device. As an example, the second network device can request the delivery of data (e.g., content), but the delivery of the requested data is provided via the first network device. As another example, the first network device can provide command and control information to the first service provider, but the actual command and control can be implemented via a service provided via the second network device associated with the second service provider. As a further example, the first network device can authenticate a request for service with a first service provider. Once authenticated, the requested service can be provided via the second network device, which may not be associated with the first service provider.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a first network device, an authoritative network device associated with a network protocol is not present;

in response to determining, by the first network device, that the authoritative network device is not present, assuming authority by the first network device for the network protocol;

receiving, by the first network device from a second network device, a discovery message that is associated with a service corresponding to the network protocol; and in response to receiving, by the first network device, the discovery message, preventing the second network device from providing the service by causing, by the first network device, a conflict via an interface associated with the service, wherein causing the conflict comprises:

reconfiguring the interface with a first internet protocol (IP) address that matches an IP address associated with the second network device; and providing the service via another interface corresponding to the first network device.

2. The method of claim 1, further comprising:

transmitting, by the first network device, a request for an IP address associated with the network protocol;

determining, by the first network device, that a response to the request is not received; and in response to determining that the request is not received, determining, by the first network device, the authoritative network device associated with the network protocol is not present.

3. The method of claim 1, wherein the service comprises one or more of a Dynamic Host Configuration Protocol version 6 (DHCPv6) service, an Internet Protocol version 6 (IPv6) routing and security service, an IPv6 neighbor discovery service, an IPv6 router discovery service, or an IPv6 server and client service.

4. The method of claim 1, wherein the first network device facilitates one or more services based on one or more of the first network protocol or a second protocol.

5. The method of claim 1, further comprising:

broadcasting first information via the first network device, the first information relating to the service, wherein the first network device is associated with a first service provider, and wherein the first information comprises a request for the service; and broadcasting, by the first network device, based on the first information, second information via the second network device, wherein the second information facilitates provision of the service.

6. The method of claim 5, wherein the service comprises broadband Internet service, premises security service, video service, telephony service, VoIP service, or a combination thereof.

7. The method of claim 5, wherein the service relates to providing content and the second information comprises the content provided.

8. The method of claim 1, wherein causing the conflict comprises configuring one or more IP settings associated with the interface.

9. The method of claim 1, wherein the first network device is configured to provide a second service, and wherein the second service comprises one or more of an IPv4 network address translation (NAT) and routing service, an IPv4 address resolution protocol (ARP) service, or a Dynamic Host Configuration Protocol version 4 (DHCPv4) server and client service.

10. The method of claim 9, wherein the second network device is configured to provide the service via Internet Protocol version 6 (IPv6), and the second service via IPv4, wherein one or more of the service or the second service comprises a broadband Internet service, a premises security service, a video service, a telephony service, or a Voice over Internet Protocol (VoIP) service.

11. A system, comprising:
input/output circuitry; and
control circuitry configured to:
determine an authoritative network device associated with a network protocol is not present;
in response to determining that the authoritative network device is not present, assume authority by a first network device for the network protocol;
receive, a discovery message, from a second network device, that is associated with a service corresponding to the network protocol; and
in response to receiving the discovery message, prevent the second network device from providing the service by causing, by the first network device, a conflict via an interface associated with the service, wherein the control circuitry configured to cause the conflict is further configured to:
reconfigure the interface with a first internet protocol (IP) address that matches an IP address associated with the second network device; and
provide the service via another interface corresponding to the first network device.

12. The system of claim 11, wherein the input/output circuitry is further configured to:
transmit a request for an IP address associated with the network protocol;
determine that a response to the request is not received; and
wherein the control circuitry is further configured to:
in response to determining that the request is not received, determine the authoritative network device associated with the network protocol is not present.

13. The system of claim 11, wherein the service comprises one or more of a Dynamic Host Configuration Protocol version 6 (DHCPv6) service, an Internet Protocol version 6 (IPv6) routing and security service, an IPv6 neighbor discovery service, an IPv6 router discovery service, or an IPv6 server and client service.

14. The system of claim 11, wherein the first network device facilitates one or more services based on one or more of the network protocol or a second protocol.

15. The system of claim 11, wherein the control circuitry is further configured to:
broadcast first information via the first network device, the first information relating to the service, wherein the first network device is associated with a first service provider, and wherein the first information comprises a request for the service; and
broadcast, by the first network device, based on the first information, second information via the second network device, wherein the second information facilitates provision of the service.

16. The system of claim 15, wherein the service comprises broadband Internet service, premises security service, video service, telephony service, VoIP service, or a combination thereof.

17. The system of claim 15, wherein the service relates to providing content and the second information comprises the content provided.

18. The system of claim 11, wherein the control circuitry configured to cause the conflict is further configured to configure one or more IP settings associated with the interface.

19. The system of claim 11, wherein the first network device is configured to provide a second service, and wherein the second service comprises one or more of an IPv4 network address translation (NAT) and routing service, an IPv4 address resolution protocol (ARP) service, or a Dynamic Host Configuration Protocol version 4 (DHCPv4) server and client service.

20. The system of claim 19, the second network device is configured to provide the service via Internet Protocol version 6 (IPv6), and the second service via IPv4, wherein one or more of the service or the second service comprises a broadband Internet service, a premises security service, a video service, a telephony service, or a Voice over Internet Protocol (VoIP) service.

* * * * *